April 12, 1932.  B. WALKER  1,853,326
LOCKING APPARATUS FOR SEDAN BODIES OF AUTOMOBILES
Filed July 17, 1929
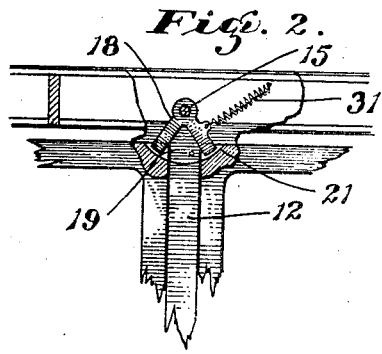
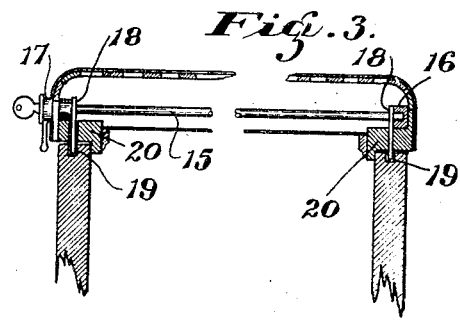
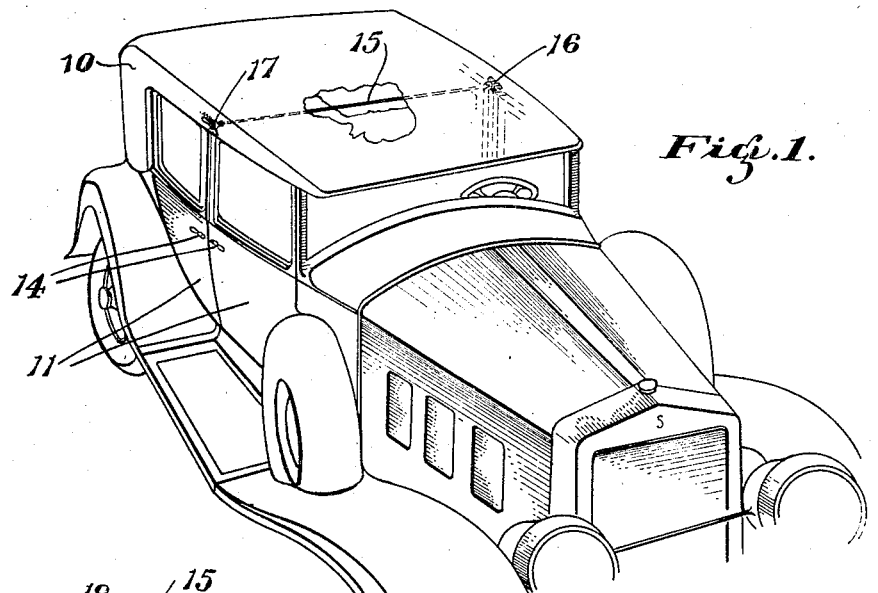
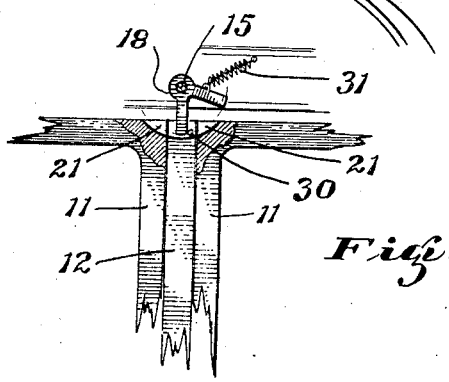
INVENTOR.
Brooks Walker.
BY Townsend, Loftus & Abbett
ATTORNEYS.

UNITED STATES PATENT OFFICE

BROOKS WALKER, OF PIEDMONT, CALIFORNIA

LOCKING APPARATUS FOR SEDAN BODIES OF AUTOMOBILES

Application filed July 17, 1929. Serial No. 378,863.

This invention relates to automobiles, and particularly pertains to a locking apparatus for simultaneously locking all of the doors of a sedan body of a vehicle to prevent unauthorized entrance thereto.

I am aware that hitherto locking apparatus has been provided which is operative from the interior of the car to locking all of the doors with the exception of the door adjacent the driver's seat. After the doors were locked, the door adjacent the driver's seat was locked from the exterior of the car. This prior apparatus requires two operations; also, it results in inconvenience due to the fact that passengers seeking to enter the car must wait until the driver enters the car and unlocks the door before they can gain entrance. This is particularly disadvantageous in inclement weather.

It is the principal object of the present invention to provide a locking apparatus for an automobile which associated with all of the doors of the automobile body and which can be actuated by a single operation from the exterior of the car.

In carrying out this object into practice, I fit the sedan body of an automobile with a control element operative from the exterior of the car, through the medium of a key controlled lock barrel. The control element and the doors of the sedan body are fitted with complementary latch parts which are controlled by the operation of the control element.

One from which the invention may assume is exemplified in the following description and illustrated by way of example in the accompanying drawings, in which:

Fig. 1 is a perspective view of an automobile having a sedan body with my improved locking apparatus fitted thereto.

Figs. 2 and 4 are fragmentary views in section, showing the manner in which the bolt is associated with the doors, and disclosing the bolt in two different positions.

Fig. 3 is a fragmentary view in transverse section through a sedan body of an automobile, showing the manner in which my improved apparatus is mounted therein.

Referring more particularly to the accompanying drawings, 10 indicates the enclosed body of an automobile vehicle. This body is fitted with a pair of doors 11 at each side which open oppositely from substantially the center of the body. A single jamb or vertical post 12 is provided between each set of doors. Individual latching devices 14 are fitted to the doors 11. These devices may be of any well known design with complementary parts on the doors 11 and posts 12 and are provided for use in latching the doors closed under ordinary conditions.

The present invention is particularly concerned with a key controlled apparatus for locking all four doors of the car when it is not in use to prevent unauthorized entrance into the car.

The principal feature of this device is that all the doors may be locked simultaneously in one operation from the exterior of the car by a single key controlled locking mechanism. Although I have illustrated and described the invention for use in connection with a four-door sedan body, I have in mind the principle of locking all of the door of the body regardless of whether the number thereof is two, three or four doors.

To accomplish my object, I provide a bolt shaft 15 which extends transversely between the sides of the body, preferably disposed between the top of the body and the top lining as illustrated in Figs. 2 and 3. In this position, this bolt shaft will be concealed. At one end the bolt shaft 15 is rotatably supported in a suitable bearing 16, while at the other end the shaft is connected with a key controlled lock barrel 17 which controls the turning movement of the shaft. At each end the shaft is fitted with a fixed multiple headed bolt 18 which is in the form of two radially extending bolts which are spaced approximately ninety degrees apart.

Each multiple headed bolt operates in a slot 19 formed through the adjacent upper sill 20 of the vehicle body. This slot 19 is formed directly over the contiguous jamb or post 12. In alignment with the slot 19 and the bolt mounted therein, the upper end of the post 12 and the adjacent corners of the doors are formed with a keeper socket 21.

This socket 21 is formed on a radius emanating from the center of the bolt shaft, which radius is just slightly greater than the distance which the bolts of the multiple headed bolt extend from the center of the shaft so that these bolts may swing through the socket.

In locking position, the bolts are disposed in the keeper sockets in the corners of the adjacent doors. When in non-locking position, each bolt is disposed with one of its bolts in the keeper socket in the center post, while the other bolt is disengaged from the socket in the adjacent door. Thus, the doors may be freely operated.

A stop member 30 is provided in each of the sockets so as to limit the turning movement of the bolt shaft in one direction. To maintain the bolt in ineffective position, a spring 31 is connected to the vehicle body and to the bolt and acts to maintain the bolt in inoperative position.

In operation of the device, the locking apparatus is constructed substantially as shown in the drawings, and is assembled in the sedan body of the automobile to which it is to be fitted. Under all normal conditions, when the car is in use the bolts are maintained in an ineffective position such as shown in Fig. 3.

When it is desired to park the car and to lock the doors to prevent unauthorized entrance thereto, the doors are all closed and a key is inserted in the key barrel to turn the bolt shaft and place the bolts into latching position relative to the doors. Upon withdrawal of the key from the lock barrel, the doors will be effectively locked against unauthorized entrance. When desiring to enter the car, the proper key is inserted in the lock barrel and the bolt shaft turned to position the bolts in their ineffective positions. All the doors may then be opened by operation of the usual door latches fitted to doors of this type.

From the foregoing, it is obvious that I have provided a very simple and effective form of apparatus which is operative from the exterior of the car so that in a single operation all of the doors of the sedan body may be either locked or unlocked as the case may be.

While I have shown the preferred form of my invention, it is to be understood that various changes in its construction and operation may be made without departing from the spirit of the invention as defined in the appended claim.

Having thus described my invention, what I claim and desire to secure by Letters Patent is—

Locking means for a vehicle of the closed type having a door at each side thereof and wherein each door is formed with a keeper socket adjacent the upper edge of the door including a one piece rigid rotatable bolt shaft journalled transversely of the vehicle body and disposed transversely and horizontally above the upper edges of said doors, bolts associated with the shaft, each of said bolts being associated with its respective keeper socket, in each of said doors, whereby rotation of the shaft will place said bolts into or out of register with said keeper sockets, and key controlled means operative from the exterior of the body to revolve said shaft and thereby actuate the bolts.

BROOKS WALKER.

Patent No. 1,853,326                            Granted April 12, 1932

BROOKS WALKER

The above entitled patent was extended July 24, 1951, under the provisions of the act of June 30, 1950, for 6 years and 214 days from the expiration of the original term thereof.

*Commissioner of Patents.*